United States Patent
Mermelstein

(10) Patent No.: US 9,356,416 B2
(45) Date of Patent: May 31, 2016

(54) SUPPRESSION OF STIMULATED BRILLOUIN SCATTERING IN HIGHER-ORDER-MODE OPTICAL FIBER AMPLIFIERS

(71) Applicant: OFS Fitel, LLC, Norcross, GA (US)

(72) Inventor: Marc Mermelstein, Highland Park, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/205,596

(22) Filed: Mar. 12, 2014

(65) Prior Publication Data

US 2014/0314372 A1    Oct. 23, 2014

Related U.S. Application Data

(60) Provisional application No. 61/799,796, filed on Mar. 15, 2013.

(51) Int. Cl.

| | |
|---|---|
| *G02B 6/26* | (2006.01) |
| *G02B 6/42* | (2006.01) |
| *G02B 6/00* | (2006.01) |
| *H01S 3/00* | (2006.01) |
| *H04B 10/25* | (2013.01) |
| *H01S 3/30* | (2006.01) |
| *H01S 3/067* | (2006.01) |
| *G02B 6/02* | (2006.01) |
| *G02B 6/028* | (2006.01) |

(Continued)

(52) U.S. Cl.
CPC ........ *H01S 3/06729* (2013.01); *G02B 6/02009* (2013.01); *G02B 6/02023* (2013.01); *H01S 3/0672* (2013.01); *G02B 6/0288* (2013.01); *H01S 3/0804* (2013.01); *H01S 3/1618* (2013.01); *H01S 2301/03* (2013.01)

(58) Field of Classification Search
CPC .............. H01S 3/0672; H01S 3/06729; H01S 3/06733; H01S 3/06716; G02B 6/02023; G02B 6/02009
USPC .......... 385/28, 122; 359/333, 341, 1, 3; 372/6
See application file for complete search history.

(56) References Cited

U.S. PATENT DOCUMENTS

| | | | |
|---|---|---|---|
| 6,445,494 B1 * | 9/2002 | Nilsson et al. | ............. 359/341.1 |
| 6,687,440 B2 | 2/2004 | Balestra et al. | |
| 6,965,469 B2 * | 11/2005 | Avizonis | ............. H01S 3/06708 359/341.1 |

(Continued)

OTHER PUBLICATIONS

Ramachandran, et al, "Light Propagation with Ultralarge Modal Areas in Optical Fibers", Jun. 15, 2006 / vol. 31, No. 12 / Optics Letters, pp. 1797-1799.

*Primary Examiner* — Robert Tavlykaev
(74) *Attorney, Agent, or Firm* — Wendy Koba, Esq.

(57) ABSTRACT

An HOM-based optical fiber amplifier is selectively doped within its core region to minimize the presence of dopants in those portions of the core where the unwanted lower-order modes (particularly, the fundamental mode) of the signal reside. The reduction (elimination) of the gain medium from these portions of the core minimizes (perhaps to the point of elimination) limits the amount of amplification impressed upon the backward-propagating Stokes wave. This minimization of amplification will, in turn, lead to a reduction in the growth of the Stokes power that is generated by the Brillouin gain, which results in increasing the amount of power present in the desired, forward-propagating HOM amplified optical signal output.

9 Claims, 3 Drawing Sheets

(51) Int. Cl.
*H01S 3/08* (2006.01)
*H01S 3/16* (2006.01)

(56) References Cited

U.S. PATENT DOCUMENTS

| | | |
|---|---|---|
| 7,171,074 B2 | 1/2007 | DiGiovanni et al. |
| 7,259,907 B2 * | 8/2007 | Langhans ................. 359/341.1 |
| 7,437,040 B2 | 10/2008 | Flammer |
| 7,558,461 B2 | 7/2009 | Chen et al. |
| 7,733,561 B2 | 6/2010 | Mermelstein et al. |
| 7,856,162 B2 | 12/2010 | DiGiovanni et al. |
| 8,000,570 B2 | 8/2011 | Digiovanni et al. |
| 8,582,609 B2 * | 11/2013 | Tong et al. ........................ 372/6 |
| 2006/0103919 A1 * | 5/2006 | DiGiovanni ....... G02B 6/02019 359/341.5 |
| 2010/0008633 A1 * | 1/2010 | Digiovanni et al. .......... 385/123 |
| 2010/0027938 A1 * | 2/2010 | Digiovanni et al. ............ 385/29 |
| 2010/0103959 A1 * | 4/2010 | Digiovanni et al. ............... 372/6 |
| 2011/0064095 A1 * | 3/2011 | Gapontsev ......... G02B 6/03611 372/6 |
| 2011/0091178 A1 * | 4/2011 | Gapontsev ......... G02B 6/02023 385/127 |
| 2012/0250705 A1 * | 10/2012 | Tong .................. H01S 3/06704 372/6 |

* cited by examiner

SUPPRESSION OF STIMULATED BRILLOUIN SCATTERING IN HIGHER-ORDER-MODE OPTICAL FIBER AMPLIFIERS

CROSS-REFERENCE TO RELATED APPLICATIONS

This application claims the benefit of U.S. Provisional Application No. 61/799,796, filed Mar. 15, 2013.

TECHNICAL FIELD

The present invention relates to fiber-based optical amplifiers and, more particularly, to fiber amplifier gain modules utilizing higher-order modes (HOMs) of a propagating optical signal, where the HOM fiber within the gain module is suitably doped to suppress stimulated Brillouin scattering (SBS) and increase the optical power output of the fiber amplifier.

BACKGROUND OF THE INVENTION

High power fiber amplifiers have been the subject of intensive research and development for applications such as material processing and defense. Amplification of single frequency radiation (e.g., laser linewidths less than 100 MHz) is required for specific applications, such as coherent combination of multiple apertures for power scaling and large scale interferometric measurement techniques such as gravity wave detection.

Fiber-based optical amplifiers offer several advantages relative to conventional solid-state lasers in these applications, such as better conversion efficiencies, ease in thermal management, broadband gain and good transverse mode stability. However, the relatively long interaction length L required by optical fiber amplifiers imposes significant nonlinear limitations to achieving maximum optical power. The most severe nonlinear limit for single frequency amplifiers is stimulated Brillouin scattering (SBS).

SBS is an inherent effect that occurs in fiber amplifiers in which the forward-propagating power in the amplifier is converted into backward-propagating power with a slightly downward frequency shift that limits the power transfer through the amplifier. The backward propagating Stokes wave essentially robs power from the desired, forward propagating signal so as to limit the power of the optical signals that can be transmitted via the optical fiber. With reference to quantum physics, SBS can therefore be described by the transfer of a photon from the optical wave into a new Stokes photon of lower frequency and the creation of a new phonon that adds to the acoustic wave. Even though the Stokes power is low at the source of the Stokes wave in an optical amplifier, the backward-propagating Stokes light undergoes ionic gain, competing with the desired "forward" gain of the propagating signal and, as a result, clamping the output power of the amplifier. Other detrimental optical noise signals typically occurring in fiber lasers and amplifiers can have the similar effect of experiencing ionic gain (and thus further limiting the available output power in the amplifier). For example, unwanted Raman scattering may overlap with the broad gain bandwidth of various types of gain medium, thus also experiencing ionic gain. Additionally, unwanted optical modes can experience ionic gain when they spatially overlap with the gain-doped region of the fiber core. Clearly, ionic gain is problematic and techniques that achieve selective ionic gain for the desired optical mode of interest while reducing (or eliminating) ionic gain in the unwanted modes (defined as "noise" in this context) is highly desirable.

One recent approach to increasing the power threshold associated with the onset of SBS in fiber amplifiers involves the use of higher-order mode (HOM) optical fibers. The power threshold for SBS in passive optical fibers is frequently cited as:

$$P_{th} = \frac{21 A_{eff}}{g_B L_{eff}}, \qquad (1)$$

where $A_{eff}$ is the effective area of the optical core region, $g_B$ is the Brillouin gain coefficient and $L_{eff}$ is the effective interaction length of the optical fiber amplifier. The effective interaction length is defined as follows:

$$L_{eff} = \frac{1 - e^{-\alpha L}}{\alpha} \qquad (2)$$

where $\alpha$ is the optical attenuation coefficient in units of inverse meters and L is the physical length of the fiber. Further, the optical effective area $A_{eff}$ for a radially-symmetric optical mode can be defined as follows:

$$A_{eff} = \frac{\langle f(r)^2 \rangle_r^2}{\langle f(r)^4 \rangle_r}, \qquad (3)$$

where f(r) is the electric field distribution of the propagating optical mode and < . . . >, represents the integral over the defined fiber cross section.

It is well-known that an optical fiber designed to support the propagation of higher-order modes (such as, for example, the $LP_{08}$ mode) exhibits a larger optical effective area $A_{eff}$ than fibers used for propagating of fundamental mode ($LP_{01}$) signals. This larger value of $A_{eff}$ leads to an increase in the SBS power threshold (see equation (1)). Indeed, an HOM fiber designed to propagate the $LP_{08}$ mode may have an effective area of approximately 1800 $\mu m^2$, compared to a more conventional large mode area (LMA) fiber supporting the propagation of the fundamental $LP_{01}$ mode with an effective area of approximately 300 $\mu m^2$. Other optical effects that impose limits due to high optical intensity, such as the nonlinear mechanisms of stimulated Raman scattering, self-phase modulation, cross-phase modulation, modulation instability, and the like, similarly benefit from the larger $A_{eff}$ of HOM fiber.

While, in theory, the utilization of higher-order modes (and the associated larger effective area) should provide a significant improvement over the use of lower-order mode (LOM) signals in a fiber amplifier, the actual power thresholds associated with the use of HOMs have not been found to be as high as expected.

SUMMARY OF THE INVENTION

These and other limitations of HOM-based fiber amplifiers are addressed by the present invention, which relates to fiber amplifier gain modules utilizing higher-order modes (HOMs) of a propagating optical signal where the HOM fiber within the gain module is suitably doped to suppress stimulated Brillouin scattering (SBS) and increase the optical power output of the fiber amplifier. In use, the fiber amplifier gain module typically includes an input mode converter for converting the fundamental $LP_{01}$ mode signal into the specific higher-order mode selected for use in the amplifier (for example, the $LP_{08}$ mode), and also an output mode converter for ultimately re-converting the amplified HOM signal back to the original fundamental mode.

It has been discovered that the SBS power threshold in HOM optical fibers is complicated by cross-mode SBS generation—that is, not only is a backward-propagating Stokes signal created in the propagating higher-order mode (such as, for example, $LP_{08}$), but also in every other LOM, including the fundamental mode. Furthermore, these LOMs can achieve significant ionic gain in a rare earth doped optical fiber. As a result, the SBS threshold for cross-mode stimulated light scattering is governed by the cross-mode optical effective area, which may be significantly less than the effective area where the pump and Stokes light propagate in the same optical mode. Similarly, any mechanism that generates light in the LOMs (such as, for example, imperfect splicing, imperfect mode conversion, stimulated Raman scattering, and the like, will affect the cross-mode optical effective area.

In accordance with the present invention, an HOM gain fiber of an HOM-based fiber amplifier is selectively doped to minimize the presence of dopants in regions of the core where these LOMs (particularly, the fundamental mode) of mechanisms such as the Stokes signal predominantly reside. The reduction of the gain medium in these specific regions of the core therefore minimizes the level of ionic amplification impressed upon the LOM light, where the term "reduction" is used in this sense to also include the case where no appreciable amount of gain medium is intentionally introduced into the regions where the cross-modal components reside (i.e., these regions remain undoped). The minimization of ionic gain will further suppress SBS growth of the Stokes power as the Stokes wave continues to propagate in the backward direction along the HOM gain fiber. As a result, this suppression of SBS growth creates an increase in the overall output power of the amplified signal.

In one embodiment of the present invention, a Yb-doped HOM fiber amplifier is utilized, with the Yb dopant excluded from the portion of the core region where the fundamental mode of the backward-propagating Stokes wave resides (in this case, the central, inner region of the core). Exclusion of the Yb dopant from this inner region of the core is not expected to significantly impact the amplifier gain of the forward-propagating HOM optical signal, since the HOM signal is present across the complete extent of the core area and will experience gain within an "outer" region of the core which has been doped.

Other and further embodiments and aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Prior to describing the parameters of the present invention, the workings of a conventional HOM-based fiber amplifier will be briefly reviewed, in order to assist in the understanding of the improvements afforded by the arrangement of the present invention.

Figure 1:
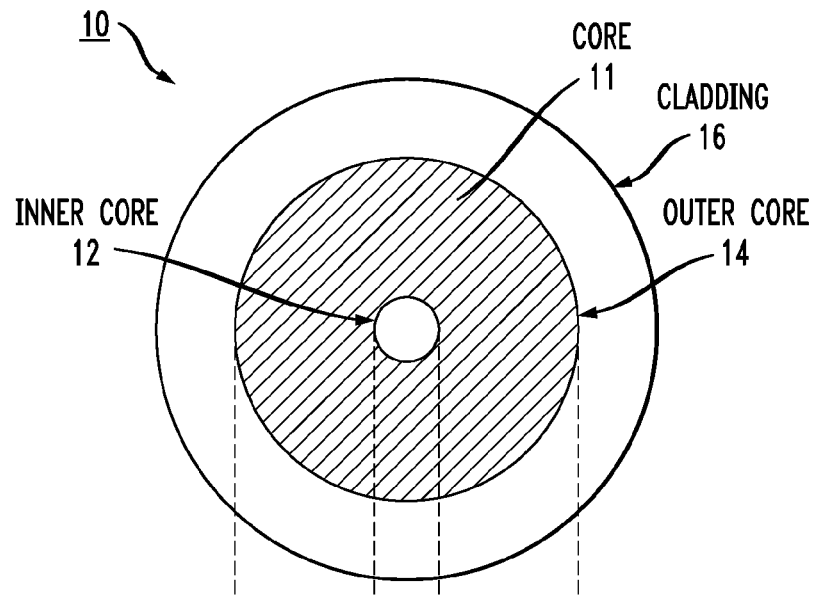
FIG. 1 is a cross-sectional view of an exemplary section of conventional HOM fiber that may be used within a gain module of a fiber amplifier.
Figure 2:
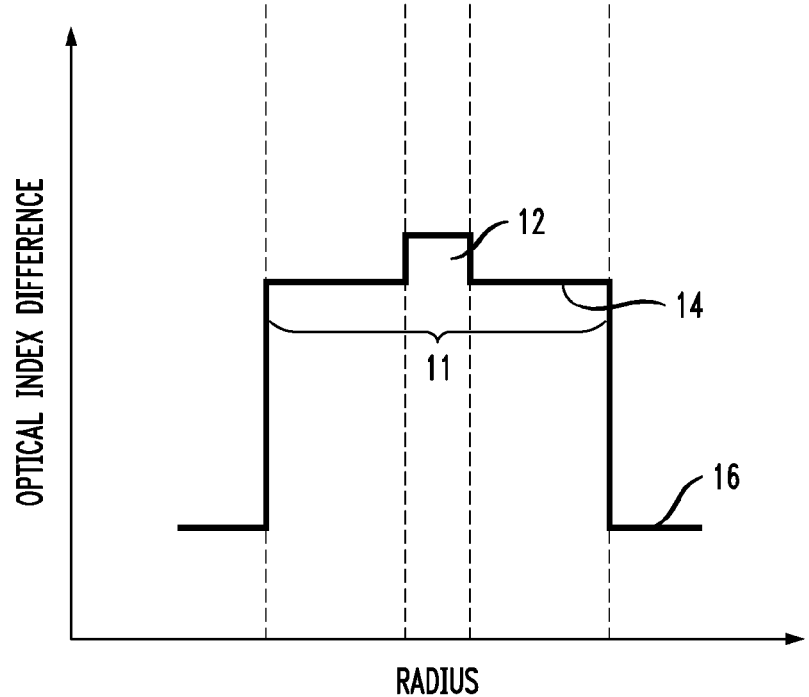
FIG. 2 is a refractive index profile associated with the HOM fiber of FIG. 1.

FIG. 1 is a cross-sectional view of an exemplary section of HOM fiber 10 for use in a gain module of a fiber amplifier. While not illustrated in particular, it is to be understood that the actual gain module would also include input and mode converters to transition between the conventional fundamental mode signal propagating through the system and the selected HOM used by the gain module. As shown in particular in FIG. 1, HOM fiber 10 includes a core 11 comprised of a central (or inner) core region 12, and an outer core region 14, with core 11 surrounded by a lower index (down-doped) cladding region 16. FIG. 2 contains a refractive index profile for HOM fiber 10 of FIG. 1, showing the relative refractive index values of each region. Compared to conventional single mode fibers configured to support the propagation of only the fundamental $LP_{01}$ mode, the diameter of an HOM fiber (in this case, the combination of inner region 12 and outer region 14 forming core 11) is relatively wide, on the order of 80 μm or larger.

To create a prior art fiber amplifier in HOM fiber, a gain medium dopant (such as, for example, Ytterbium (Yb)) is added to the entire core (in this case, therefore, both regions 12 and 14 forming core 11). The addition of the gain dopant increases the optical power present in the propagating higher-order mode signal traveling along the core. While the following discussion describes a specific embodiment where Yb is the dopant selected to provide gain, it is to be understood that various other rare earth materials may be used and also provide optical gain (e.g., erbium, neodymium, Cr, Tm, etc.).

While it would seem that the utilization of higher-order modes (and the associated increased optical effective area) would increase the SBS power threshold and provide a significant improvement over previous designs based on using a fundamental mode signal, this has not been found to be the case. Indeed, it has been determined that there are at least two other considerations that may limit the amount of improvement in the SBS power threshold that an HOM fiber amplifier exhibits relative to a fundamental mode fiber amplifier. First, it has been found that the SBS power threshold is not determined by the "ideal" increased optical effective area of HOMs, but instead is determined by a relatively smaller "cross-modal" optical effective area, as will be described in detail below. Additionally, the LOMs populated by this cross-mode coupling may achieve significant ionic gain in a rare earth doped optical fiber amplifier as a result of the different modal overlap of the HOMs and LOM with the gain dopant.

As a result of these discoveries, it has now been determined that there are several relevant optical effective areas corresponding to Stokes radiation in each of the propagating modes. Therefore, the idealized equation for effective area as shown above in equation (3) is more accurately reflected by the following expression, illustrating the multiplicity of optical effective areas relevant for determining the SBS threshold in an HOM fiber:

$$A_{0m0n} = \frac{\langle f_{0m}(r)^2 \rangle_r \cdot \langle f_{0n}(r)^2 \rangle_r}{\langle f_{0m}(r)^2 \cdot f_{0n}(r)^2 \rangle_r}, \quad (4)$$

where $f_{0m}$ is the electric field distribution for forward-directed light propagating in the $LP_{0m}$ mode and $f_{0n}$ is the electric field distribution for backward-directed Stokes light in the $LP_{0n}$ mode. Therefore, selected effective areas $A_{0m0n}$ as defined by equation (4) can be significantly smaller that the ideal $A_{0808}$ value presumed for the original HOM fiber amplifier model, which accounted only for light propagating forward and backward in the $LP_{08}$ mode and ignored the possibility of any cross-modal components.

In one example, suppose it is desired to use the $LP_{08}$ mode for the forward propagating signal to be amplified. In this case, $A_{0801}$ (i.e., the cross-modal effective area between the $LP_{08}$ mode and the fundamental $LP_{01}$ mode) is estimated to be 700 μm², while $A_{0808}$ is 1800 μm². Therefore, in actual design, the maximum power output of an HOM-based fiber amplifier will be limited by the cross-mode effective area $A_{0801}$, not the single HOM mode optical effective area $A_{0808}$.

In accordance with the present invention, this problem of cross-modal effects is addressed by selectively doping regions in the fiber core so as to exclude dopants (i.e., gain medium) in regions where the cross-modal signal is high (ideally, where the cross-modal signal is greatest). This selective doping arrangement avoids the amplification of the noise signal present in the LOM signals. Stated another way, the fiber core is selectively doped such that the overlap integral between the gain dopant and the desired HOM mode, while minimizing the overlap integral of the gain dopant with the unwanted LOMs.

Figure 3:
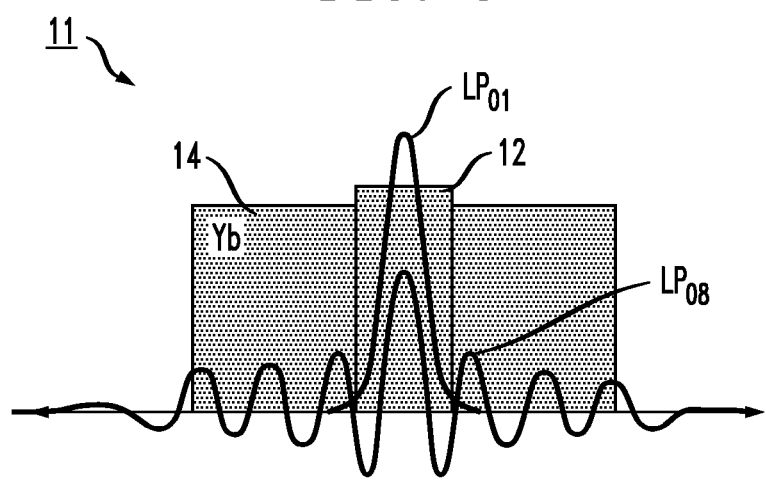
FIG. 3 is an enlarged view of the core region of the index profile of FIG. 2, indicating the overlap of both the desired $LP_{08}$ forward-propagating signal and the undesired $LP_{01}$ backward-propagating Stokes wave and the presence of uniform Yb dopant within the entire core region, as indicated by the shading.

FIG. 3 is an enlarged view of core 11 of the refractive index profile of FIG. 2, in this case indicating the presence of a Yb dopant as the gain medium. FIG. 3 illustrates a prior art arrangement where the gain medium is included within the entire expanse of core 11—that is, within both inner region 12 and outer core regions 14. This conventional doping of both inner core region 12 and outer core region 14 is designated by the shaded areas in FIG. 3. In this case, the overlap integral $\Gamma_{sig}$ of the $LP_{08}$ signal with respect to the doped area is essentially equal to unity (i.e., a maximum value, since the presence of the dopant and the $LP_{08}$ signal is essentially co-extensive within core 11). As shown, the overlap integral of the (unwanted) $LP_{01}$ mode (denoted $\Gamma_{01}$) with the doped area is also close to unity (which is an undesirable result, since this overlap integral should be minimal). Indeed, this undesirable high overlap in the unwanted $LP_{01}$ mode provides ionic gain to the backward-propagating Stokes light, increasing the backward-propagating Stokes power and reducing the SBS power threshold of the fiber amplifier. Note that while most of the $LP_{08}$ mode propagates beyond inner core region 12, most of the $LP_{01}$ mode resides within inner core region 12. Moreover, other mechanisms that also excite LOMs (such as imperfect splicing, SRS, etc.) may similarly impair amplifier performance.

In accordance with the present invention, therefore, selective doping is used to introduce the gain dopant (in this case, Yb) in the core regions where the HOM signal ($LP_{08}$, for example) predominantly resides, and exclude this gain dopant from core regions where a large fraction of the fundamental mode (or other unwanted LOMs) signals are found.

Figure 4:
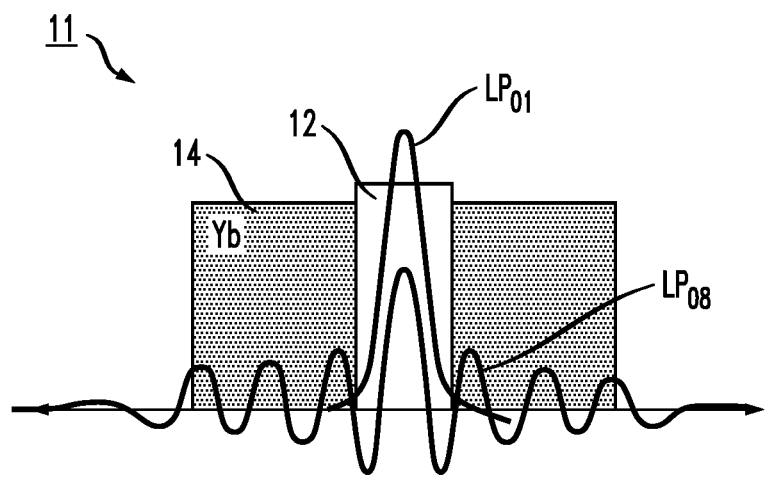
FIG. 4 is a dopant profile of a Yb-doped HOM fiber amplifier formed in accordance with the present invention to exclude the Yb dopant from the inner portion of the core region (where the $LP_{01}$ mode resides) and reduce the presence of cross-modal SBS generation, the absence of shading in the inner portion indicating the absence of the Yb dopant.

FIG. 4 is a refractive index profile of a section of HOM fiber formed as a fiber amplifier, where the core region of the fiber is selectively doped to exclude the dopant from the region where the unwanted LOM signals are found. Referring to FIG. 4, both the desired HOM mode ($LP_{08}$) signal and the unwanted LOM (the fundamental $LP_{01}$ mode) are shown. While the diagram of FIG. 4 illustrates the use of $LP_{08}$ mode as the HOM "selected" for use within the amplifier, it is to be understood that any other appropriate HOM signal may be selected and used as the forward-propagating signal mode within the fiber amplifier. In reviewing FIG. 4, it is clear that in this embodiment the unwanted fundamental mode predominantly resides within inner core region 12. In this particular example, therefore, the selective doping process is controlled such that the gain dopant (Yb in this case) is excluded from inner core region 12. By restructuring the dopant profile of the gain dopant in this manner, the overlap integral $\Gamma_{01}$ between the unwanted fundamental signal $LP_{01}$ and the gain medium is substantially reduced. As a result, the ionic amplification of the backward-propagating Stokes light (or other mechanisms) is minimized, the backward-propagating Stokes power and non-linear gain is significantly reduced and the SBS threshold power is increased accordingly.

Therefore, by carefully controlling the specific regions of the HOM fiber core that are doped to correspond to those regions where the desired propagating mode signal is found (and thus leaving undoped those regions where the LOMs are greatest), the maximum output power of the HOM fiber amplifier is significantly increased, since it is no longer limited by the presence of a fundamental mode (and/or other LOM) signal that has been amplified by the gain medium. It is to be noted that while FIG. 4 shows the undoped region as being co-extensive with inner core region 12, the undoped region can extend into outer core region 14 or, alternatively, include only a portion of inner core region 12. At least one factor to consider in determining the extent of the doping is to maintain a large value of the ratio of the overlap integrals (i.e., the ratio of $\Gamma_{08}$ to $\Gamma_{01}$) such that the overlap integral of the gain dopant with the desired HOM signal is maximized and the overlap integral of the gain dopant with the unwanted LOMs is minimized.

Indeed, the growth of the Stokes intensity $I_s(r,z)$ may be modeled by that of a combined Brillouin and ionic gain amplifier, and can be mathematically described by the following equation:

$$\frac{dI_s(r, z)}{dz} = -g_B \cdot I_s(r, z) \cdot I_p(r, z) - [n_2(r, z) \cdot \sigma_e - n_1(r, z) \cdot \sigma_a] \cdot I_s(r, z), \quad (5)$$

where $I_p$ is defined as the Brillouin pump intensity (which in this case is the amplifier signal intensity), $I_s$ is the backward-propagating Stokes intensity, $\sigma_e$ is the ionic emission cross section and $\sigma_a$ is the ionic absorption cross section. The Stokes power evolution is determined by a spatial integration across the cross section of the fiber and is given by:

$$\frac{dP_s(z)}{dz} = -\frac{g_B}{A_x} \cdot P_s(z) \cdot P_p(z) - \Gamma \cdot [n_2(z) \cdot \sigma_e - n_1(z) \cdot \sigma_a] \cdot P_s(z), \quad (6)$$

where $A_x$ is defined as the cross-modal effective area given by equation (4) and $\Gamma$ defines the overlap integral of the Yb dopant with the Stokes signal. The growth of the backward-propagating Stokes wave of the combined Brillouin and Yb-dopant amplifier is expressed as:

$$P_s(0) = P_s(L) \cdot \exp\left(\frac{g_B \cdot L \cdot \langle P_P(z)\rangle}{A_x}\right) \cdot \exp[\Gamma \cdot L \cdot (\sigma_e \cdot \langle n_2(z)\rangle - \sigma_a \cdot \langle n_1(z)\rangle)]$$
$$= P_s(L) \cdot G_B \cdot G_{Yb},$$

where $<\ldots>$ indicates an average along the fiber length. Thus, $G_B G_{Yb}$ is the total gain of the backward propagating Stokes light. Thus, in accordance with the present invention, if the overlap of the Stokes light with the Yb dopant is minimal, the second exponential term goes to a unity value (that is, the value of $G_{Yb}$ is set equal to one) and the total amplification of the Stokes power is significantly reduced (i.e., is determined by only the nonlinear SBS gain $G_B$ without an ionic contribution $G_{Yb}$), thereby increasing the SBS threshold power and the maximum output power of the fiber amplifier.

Figure 5:
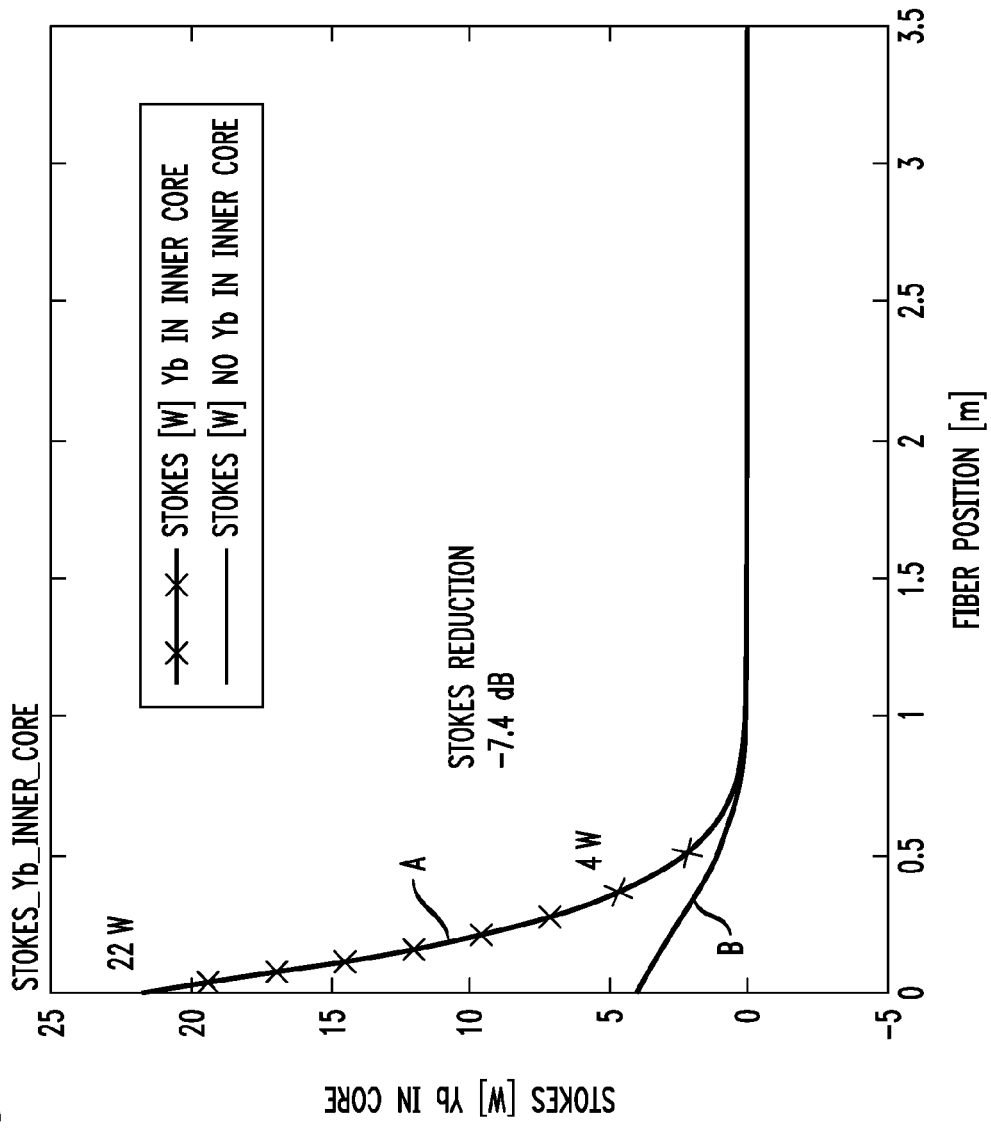
FIG. 5 is graph of SBS power threshold, comparing a prior art HOM fiber to an HOM fiber amplifier formed in accordance with the present invention.

FIG. 5 is a graph depicting the improvement in operation of an HOM fiber amplifier by selectively doping the fiber amplifier to eliminate the presence of dopant in the area where a large amount of backward-propagating Stokes signal is present. In particular, the dopant is eliminated from the region where the unwanted fundamental mode signal is propagating. Plot A is a diagram of a prior art arrangement with an essentially uniform gain dopant profile across the entire core area, illustrating the Stokes power as a function of fiber length. In this case, there is a large value in Stokes power in the core for this prior art arrangement where the Yb dopant is present within inner core region 12. Plot B is associated with an exemplary fiber amplifier of the present invention, where in this inner core region 12 remains undoped and the Yb dopant is introduced only within outer core region 14. As shown, the Stokes power is significantly reduced as a result of leaving this inner core region undoped. A reduction of −7.4 dB is associated with this particular arrangement.

Although exemplary embodiments have been shown and described, it will be clear to those of ordinary skill in the art that a number of changes, modifications, or alterations to the disclosure as presented may be made. For example, while the $LP_{08}$ mode as been described as the propagating higher-order mode, it is to be understood that other higher-order modes may be used in the design of a fiber amplifier. Similarly, unwanted Stokes signals may appear in modes other than the fundamental $LP_{01}$ mode. Other gain dopant materials may be used in place of, or in combination with, Yb, and the areas where the dopant is both included and excluded may vary as a function of the modes desired to be supported and the modes desired to be eliminated. Similarly, the index profile may be more complex and consist of multiple regions of high and low index. Indeed, all such changes, modifications and alterations should be seen as within the scope of the disclosure and defined by the claims appended hereto.

What is claimed is:

1. A gain module for an optical fiber amplifier comprising a higher-order mode (HOM) fiber for supporting the propagation of an optical signal at a selected HOM, the HOM fiber including a core with a diameter greater than 80 μm and an effective area of at least 1800 μm$^2$, the core being selectively doped with a gain dopant such that a gain dopant overlap integral associated with the selected HOM signal is maximized and approaches unity, and a gain dopant overlap integral associated with backward-propagating unwanted Stokes signals at lower-order modes (LOM) signals is minimized and approaches zero.

2. An optical fiber amplifier supporting the propagation and amplification of a selected higher-order mode (EOM) signal comprising
an input mode converter for converting an input signal propagating in a fundamental mode into the selected higher order mode;
an optical gain fiber coupled to an output of the input mode converter for receiving the selected HOM signal and creating an amplified HOM signal, the optical gain fiber including a core with a diameter greater than 80 μm and an effective area of at least 1800 μm$^2$, the core being selectively doped with a gain dopant such that the gain dopant concentration is higher in regions of the core where the selected HOM signal predominates such that an associated gain dopant overlap integral is maximized and approaches unity, and the gain dopant concentration is lower in regions of the core where backward-propagating unwanted Stokes signals at lower-order modes (LOM) predominate such that an associated gain dopant overlap integral is minimized and approaches zero; and
an output mode converter coupled to an output of the optical gain fiber for converting the amplified HOM signal into an amplified fundamental mode signal.

3. An optical fiber amplifier as defined in claim 2 wherein the core of the optical gain fiber includes an inner region and an outer region and the gain dopant concentration is higher in the outer region and lower in the inner region of the core of the optical gain fiber.

4. An optical fiber amplifier as defined in claim 3 wherein the selective doping of the core of the optical gain fiber is controlled such that the inner region of the core remains undoped.

5. An optical fiber amplifier as defined in claim 3 wherein the gain dopant comprises a rare earth material.

6. An optical fiber amplifier as defined in claim 5 wherein the gain dopant comprises a material selected from the group consisting of: Er, Yb, Cr and Tm.

7. An optical fiber amplifier as defined in claim 6 wherein the gain dopant comprises Yb dopant material.

8. An optical fiber amplifier as defined in claim 2 wherein the backward-propagating unwanted Stokes signals include a fundamental $LP_{01}$ mode signal.

9. An optical fiber amplifier as defined in claim 2 wherein the selected higher-order mode comprises an $LP_{0n}$ mode, n≥8.

* * * * *